(12) United States Patent
Piantoni

(10) Patent No.: US 11,754,152 B2
(45) Date of Patent: Sep. 12, 2023

(54) APPARATUS FOR PRESSING A TOOTHED RACK AGAINST A PINION

(71) Applicant: ZF Automotive Italia S.r.l., Turin (IT)

(72) Inventor: Angelo Piantoni, Brescia (IT)

(73) Assignee: ZF Automotive Italia S.r.l., Turin (IT)

( * ) Notice: Subject to any disclaimer, the term of this patent is extended or adjusted under 35 U.S.C. 154(b) by 0 days.

(21) Appl. No.: 17/959,676

(22) Filed: Oct. 4, 2022

(65) Prior Publication Data
US 2023/0111260 A1 Apr. 13, 2023

(30) Foreign Application Priority Data
Oct. 11, 2021 (DE) .......................... 102021211446.6

(51) Int. Cl.
*F16H 19/04* (2006.01)
(52) U.S. Cl.
CPC ....... *F16H 19/04* (2013.01); *F16H 2019/046* (2013.01)
(58) Field of Classification Search
CPC .. F16H 19/04; F16H 55/283; F16H 2019/046; F16H 2055/281; F16H 57/12; B62D 3/126; B62D 3/12; B62D 3/123; B62D 3/02; Y10T 74/1967; Y10T 74/19623; Y10T 74/18096
See application file for complete search history.

(56) References Cited

U.S. PATENT DOCUMENTS

| 6,178,843 | B1 * | 1/2001 | Machida | F16H 55/283 384/291 |
| 8,256,315 | B2 * | 9/2012 | Song | F16H 55/283 280/93.514 |
| 8,794,093 | B2 * | 8/2014 | Bareis | F16H 55/283 74/440 |

(Continued)

FOREIGN PATENT DOCUMENTS

| DE | 102009046304 A1 * | 5/2011 | ............ B62D 3/123 |
| DE | 102010029603 A1 | 12/2011 | |

(Continued)

*Primary Examiner* — Victor L MacArthur
(74) *Attorney, Agent, or Firm* — Kristin L. Murphy

(57) ABSTRACT

The disclosure relates to an apparatus for pressing a toothed rack against a pinion, having a pressure piece, wherein the pressure piece can be arranged so as to be displaceable inside a housing and in an axial direction of a centre longitudinal axis, having a bearing element that can be fixed on the housing in an axial direction with respect to the centre longitudinal axis, having a prestressing element that acts in an axial direction, wherein, as a result of the prestressing element being arranged between the bearing element and the pressure piece, the pressure piece is subjected to a prestressing force in an axial direction with respect to the centre longitudinal axis and directed away from the bearing element. In order to be able to reduce the production outlay and/or realize a more compact design, the apparatus is characterized in that a sliding element is arranged on a side, facing away from the prestressing element, of the pressure piece for the purpose of bearing against the toothed rack, (Continued)

wherein the sliding element is designed with a spring function in an axial direction of the centre longitudinal axis in order to compensate tolerances.

20 Claims, 8 Drawing Sheets

(56) References Cited

U.S. PATENT DOCUMENTS

| | | | |
|---|---|---|---|
| 9,296,412 B2 * | 3/2016 | Witting | B62D 3/123 |
| 2010/0024583 A1 | 2/2010 | Kawakubo et al. | |
| 2013/0247696 A1 | 9/2013 | Imamura | |
| 2015/0291205 A1 | 10/2015 | Nishitani et al. | |
| 2023/0111260 A1 * | 4/2023 | Piantoni | F16H 19/04 |
| | | | 74/422 |
| 2023/0115582 A1 * | 4/2023 | Piantoni | F16H 19/04 |
| | | | 74/422 |

FOREIGN PATENT DOCUMENTS

| | | | | |
|---|---|---|---|---|
| JP | H11198826 A | | 7/1999 | |
| KR | 20120140304 A | * | 12/2012 | F16H 19/04 |

* cited by examiner

APPARATUS FOR PRESSING A TOOTHED RACK AGAINST A PINION

CROSS-REFERENCE TO RELATED APPLICATION

This application claims priority to German Priority Application No. 102021211446.6, filed Oct. 11, 2021, the disclosure of which is incorporated herein by reference in its entirety.

TECHNICAL FIELD

The disclosure relates to an apparatus for pressing a toothed rack against a pinion, having a pressure piece, wherein the pressure piece can be arranged so as to be displaceable inside a housing and in an axial direction of a centre longitudinal axis, having a bearing element that can be fixed on the housing in an axial direction with respect to the centre longitudinal axis, having a prestressing element that acts in an axial direction, wherein, as a result of the prestressing element being arranged between the bearing element and the pressure piece, the pressure piece is subjected to a prestressing force in an axial direction with respect to the centre longitudinal axis and directed away from the bearing element.

BACKGROUND

An apparatus of this type is known from DE 10 2010 029 603 A1. Such an apparatus consists of multiple individual parts or elements that can be preassembled using a clamping pin to form an assembly unit. This assembly unit can then be mounted in the housing. The housing may be in the form of an independent element or an integral or one-piece constituent part of a gear housing, in particular a steering gear housing. In order to compensate tolerances, in particular to compensate play and/or wear, the known apparatus has two adjusting discs that can be rotated relative to one another and a spring disc in the form of singles element or components. The multiplicity of individual elements for forming the apparatus can lead to an increased production outlay.

SUMMARY

What is needed is to further develop an apparatus of the type mentioned in the introduction in such a way that the production outlay can be reduced and/or a more compact design can be realized.

Various embodiments are disclosed in the following description.

Accordingly, the disclosure relates to an apparatus for pressing a toothed rack against a pinion. For example, the apparatus is designed for use in a steering gear and/or a steering mechanism. The apparatus is preferably in the form of a steering gear or a steering mechanism. The steering gear and/or the steering mechanism may be designed for use in a vehicle or be arranged in a vehicle. For example, the apparatus and/or the steering gear and/or the steering mechanism comprise(s) the toothed rack and the pinion. The pinion may be in the form of a pinion gearwheel or a pinion shaft, preferably a worm shaft. For example, the pinion is in engagement with a gearwheel or worm gear that can be driven by a motor.

The apparatus has a pressure piece, wherein the pressure piece can be arranged or is arranged so as to be displaceable inside a housing in an axial direction of a centre longitudinal axis. For example, the apparatus comprises the housing. The housing has or forms the housing interior space. The housing interior space may be realized as a recess and/or bore. For example, the housing interior space has a hollow-cylindrical form. The pressure piece is preferably guided so as to be displaceable inside the housing in an axial direction of the centre longitudinal axis. The housing interior space and/or the pressure piece may have or define the centre longitudinal axis. The centre longitudinal axis of the housing interior space can coincide with the centre longitudinal axis of the pressure piece. For example, the pressure piece is guided displaceably in an axial direction of the centre longitudinal axis of the pressure piece, preferably along a clamping pin.

The apparatus has a bearing element. The bearing element can be fixed or is fixed on the housing in an axial direction with respect to the centre longitudinal axis. The bearing element may be in the form of a covering and/or in the form of a cover for the housing interior space and/or designed for closing the housing interior space. The bearing element may have a screw thread, such as an external thread, for screwing and/or fixing in an opening of the housing interior space. To this end, the opening and/or the housing interior space may have an internal thread of corresponding form to the external thread.

Furthermore, the apparatus has a prestressing element which acts in an axial direction. The prestressing element may be in the form of a spring, such as a compression spring and/or helical spring. By prestressing element which is arranged between the bearing element and the pressure piece, the pressure piece is subjected to a prestressing force in an axial direction with respect to the centre longitudinal axis, in particular of the housing interior space and/or of the pressure piece, and directed away from the bearing element. As a result, the toothed rack can be presses against the pinion by the pressure piece.

The apparatus has a sliding element. In this respect, the sliding element is arranged on a side, facing away from the prestressing element, of the pressure piece for the purpose of bearing against the toothed rack. During operation, the toothed rack can be displaced by the pinion in a longitudinal direction of the toothed rack in order to steer wheels. In this respect, the toothed rack slides along the sliding element and is at the same time pressed against the pinion. The sliding element can have a circular arc segment-like or substantially circular arc segment-like cross section. This cross section is designed to bear against the toothed rack.

The sliding element is designed with a spring function in an axial direction of the centre longitudinal axis, in particular of the housing interior space and/or of the pressure piece, in order to compensate tolerances.

In this respect, it is advantageous for the sliding element according to the disclosure to perform a dual function. Firstly, the sliding element is designed to bear against the toothed rack and for sliding the toothed rack along the sliding element with as little friction and/or wear as possible. Secondly, the sliding element performs a spring function in an axial direction of the centre longitudinal axis. As a result, it is possible to at least partially compensate tolerances, in particular a play and/or wear, by the sliding element. In particular, this makes it possible to dispense with a spring washer as an additional and independent component, since its function is taken on by the sliding element. In this way, fewer individual parts are required to produce the apparatus, as a result of which the production outlay can be reduced and/or more compact designs can be realized.

Unevennesses on a toothset of the toothed rack and/or on the pinion, out-of-roundnesses of the toothed rack and/or of the pinion, or other tolerances can be compensated by the spring function of the sliding element.

In an example embodiment, the sliding element has a spring contour for the purpose of realizing the spring function. Owing to the spring contour, the sliding element is under a prestress between the pressure piece and the toothed rack in an axial direction of the centre longitudinal axis in a mounted state, in particular in a steering gear and/or in a steering mechanism and with the toothed rack. The spring function and/or the spring contour makes it possible to compensate tolerances in an axial direction of the centre longitudinal axis. The sliding element preferably has the spring contour in at least one portion or in multiple portions.

In an example embodiment, the spring contour has at least one concave portion and/or at least one convex portion on an inner side, facing the pressure piece, and/or on an outer side, facing the toothed rack, of the sliding element. In this respect, a respective concave portion and convex portion together may form the spring contour and/or at least a region or portion of the spring contour. For example, the spring contour on the outer side of the sliding element has at least one convex portion or two convex portions. The spring contour on the inner side of the sliding element has at least one concave portion or two concave portions. In a mounted state, the at least one convex portion can be elastically deformed in the direction of the at least one concave portion. This results in the prestress in an axial direction of the centre longitudinal axis. A respective concave portion is preferably formed owing to the design of a respective convex portion. Therefore, the combination of a convex portion and a concave portion may form the spring contour or a region or portion of the spring contour.

According to a further embodiment, the spring contour has multiple groove-like depressions or two groove-like depressions. In particular, the at least one concave portion is in the form of a groove-like depression or the two concave portions are in the form of two groove-like depressions. The groove-like depressions may extend in an axial direction of the toothed rack, in particular parallel to the longitudinal extent of the toothed rack. The at least one groove-like depression or the two groove-like depressions may be arranged in a predefined angle range with respect to the centre longitudinal axis, in particular of the housing interior space and/or of the pressure piece. A respective groove-like depression is preferably arranged in a first angle range of +20° to +45°, in particular of +25° to +35°, and in a second angle range of −20° to −45°, in particular of −25° to −35°, with respect to the centre longitudinal axis and proceeding from a centre point of the toothed rack.

The spring contour may have multiple web-like elevations or two web-like elevations. For example, the at least one convex portion is in the form of a web-like elevation or the two convex portions are in the form of two web-like elevations. The web-like elevations may extend in an axial direction of the toothed rack, in particular parallel to the longitudinal extent of the toothed rack. A respective groove-like depression is preferably formed owing to the design of a respective web-like elevation. The web-like elevation may be arranged in a predefined angle range with respect to the centre longitudinal axis, in particular of the housing interior space and/or of the pressure piece. For example, a respective web-like elevation is arranged in a first angle range of +20° to +45°, such as +25° to +35°, and in a second angle range of −20° to −45°, such as of −25° to −35°, with respect to the centre longitudinal axis and proceeding from a centre point of the toothed rack.

According to a further embodiment, the sliding element has a multi-layered, in particular 3-layered, form. In this respect, multiple material layers of the sliding element are arranged one on top of another radially with respect to the longitudinal axis of the toothed rack and/or with respect to the centre longitudinal axis of the toothed rack. The sliding element is preferably made from spring steel or the sliding element comprises spring steel, preferably as a first material layer. The use of spring steel makes it possible to easily and cost-effectively realize the spring function of the sliding element.

In particular, a material layer facing the pressure piece is made from spring steel. Therefore, the spring steel, in particular with the spring contour, can be supported on the pressure piece. A material layer facing the toothed rack may be made from a plastic. The plastic is preferably made from an especially low-friction material, for example PTFE. A bronze material layer may be arranged between the spring steel material layer and the plastic material layer.

According to a further embodiment, the apparatus has an adjusting device. The adjusting device has an adjusting disc which is arranged between the bearing element and the pressure piece. In this respect, the adjusting disc is prestressed and/or rotatably mounted about the centre longitudinal axis by a torsion spring. The adjusting disc has a first bearing face with at least one inclined face, which bears against a second bearing face with at least one inclined face, wherein the second bearing face is in the form of a one-piece constituent part of the pressure piece or of the bearing element. Consequently, by contrast to known solutions, the use of a second adjusting disc as a separate component can be dispensed with. Instead, according to this embodiment, just a single adjusting disc is used. Since the second bearing face is in the form of a one-piece constituent part of the pressure piece or of the bearing element, the number of individual components for forming the apparatus can be reduced further. The production outlay for mounting the apparatus is reduced. Furthermore, this enables a yet more compact design.

The pressure piece can have the second bearing face on a side facing away from the toothed rack. In this respect, a side, facing away from the second bearing face, of the adjusting disc bears against the bearing element. The adjusting disc is thus supported on the bearing element in an axial direction.

In another example, the bearing element has the second bearing face on a side facing the pressure piece. In this respect, a side, facing away from the bearing element, of the adjusting disc bears against the pressure piece. The adjusting disc is thus supported on the pressure piece in an axial direction here.

BRIEF DESCRIPTION OF DRAWINGS

The disclosure will be explained in more detail below with reference to the figures. In this respect, the same reference signs relate to components or elements that are the same, similar or have the same function. In the figures:

FIG. 8b shows a perspective side view of a bearing element for the further apparatus according to the disclosure as per FIG. 8a.

DETAILED DESCRIPTION

Figure 1:
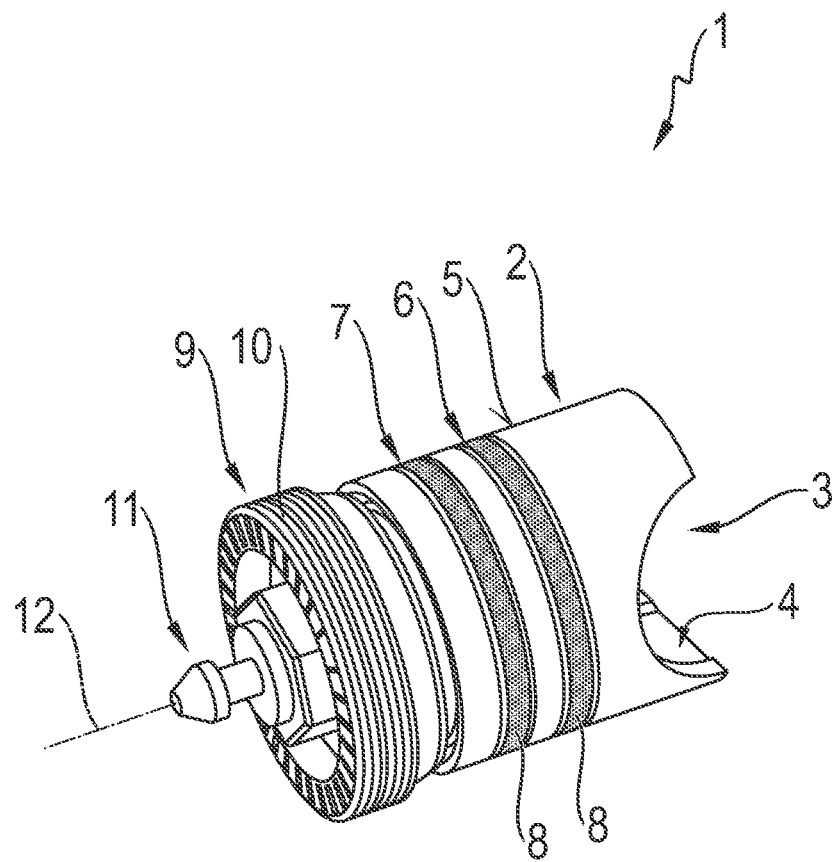
FIG. 1 shows a perspective side view of a first apparatus according to the disclosure.

FIG. 1 shows a perspective side view of a first apparatus 1 according to the disclosure. The apparatus 1 is designed to press a toothed rack, which is not illustrated in more detail here, against a pinion. For this purpose, the apparatus 1 has a pressure piece 2. The pressure piece 2 has a recess 3 for partially receiving the toothed rack. A sliding element 4 is arranged in the recess 3.

In this embodiment, the pressure piece 2 has a cylindrical outer face 5, two encircling grooves 6, 7 being formed in the outer face 5. A respective seal 8 is arranged in the grooves 6, 7. In this embodiment, each seal 8 is in the form of an O ring.

The apparatus 1 furthermore has a bearing element 9. The bearing element 9 is arranged on a side facing away from the recess 3. The bearing element 9 has a screw thread 10, which is realized as an external thread here.

In this embodiment, the apparatus 1 has a clamping pin 11. The clamping pin 11 extends through the bearing element 9 into the pressure piece 2. The apparatus 1 is preassembled as an assembly unit by the clamping pin 11. This assembly unit may then be mounted or screwed in a housing, which is not illustrated in more detail here. The apparatus 1 has a centre longitudinal axis 12. The centre longitudinal axis 12 may also be considered the centre longitudinal axis 12 of the pressure piece 2.

Figure 2:
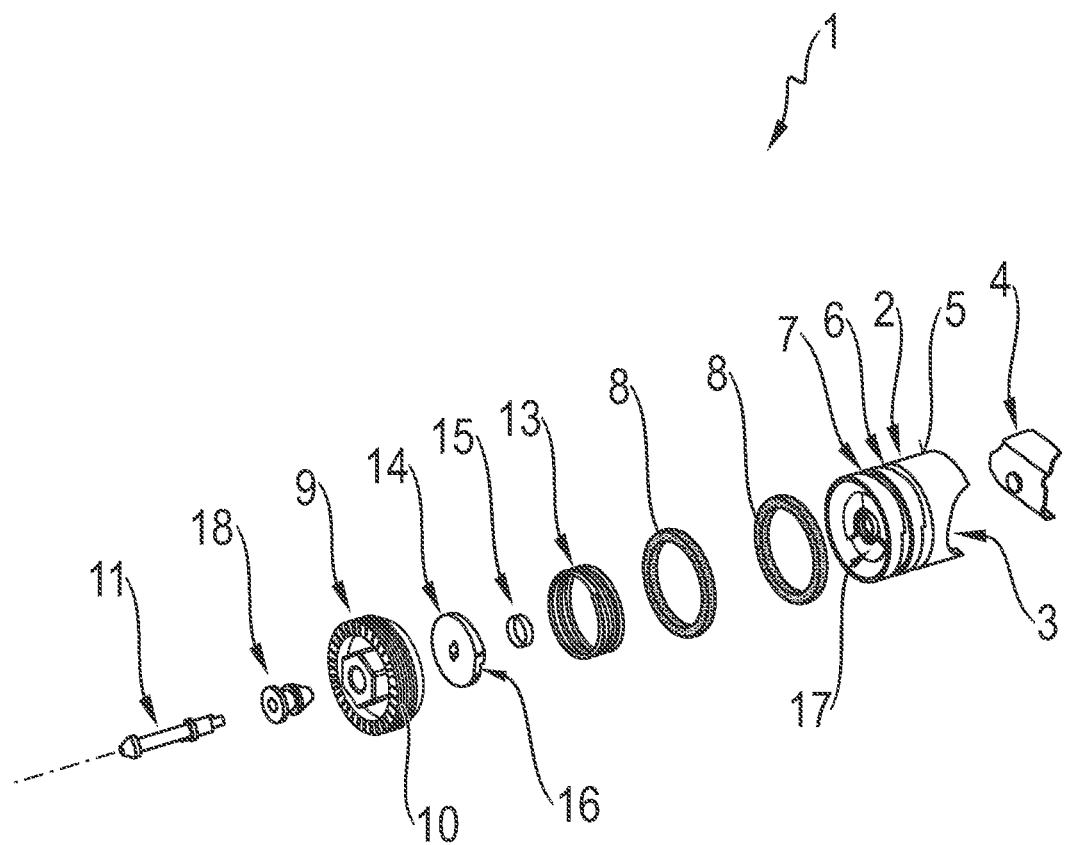
FIG. 2 shows an exploded illustration of the individual parts of the first apparatus according to the disclosure as per FIG. 1.

FIG. 2 shows an exploded illustration of the individual parts of the first apparatus 1 according to the disclosure as per FIG. 1. It can be seen that the apparatus 1 has a prestressing element 13. In this embodiment, the prestressing element 13 is in the form of a compression spring or helical spring. In the mounted state as per FIG. 1, the prestressing element 13 is arranged between the bearing element 9 and the pressure piece 2.

Furthermore, the apparatus 1 has an adjusting disc 14 and a torsion spring 15. The adjusting disc 14 has a first bearing face 16. The first bearing face 16 faces a second bearing face 17 and interacts with it in the mounted state as per FIG. 1. In this exemplary embodiment, the second bearing face 17 is in the form of a one-piece constituent part of the pressure piece 2.

In this embodiment, the apparatus 1 has an insert 18. In the mounted state as per FIG. 1, the insert 18 is arranged on the bearing element 9, the damping pin 11 being guided through the insert 18.

Figure 3:
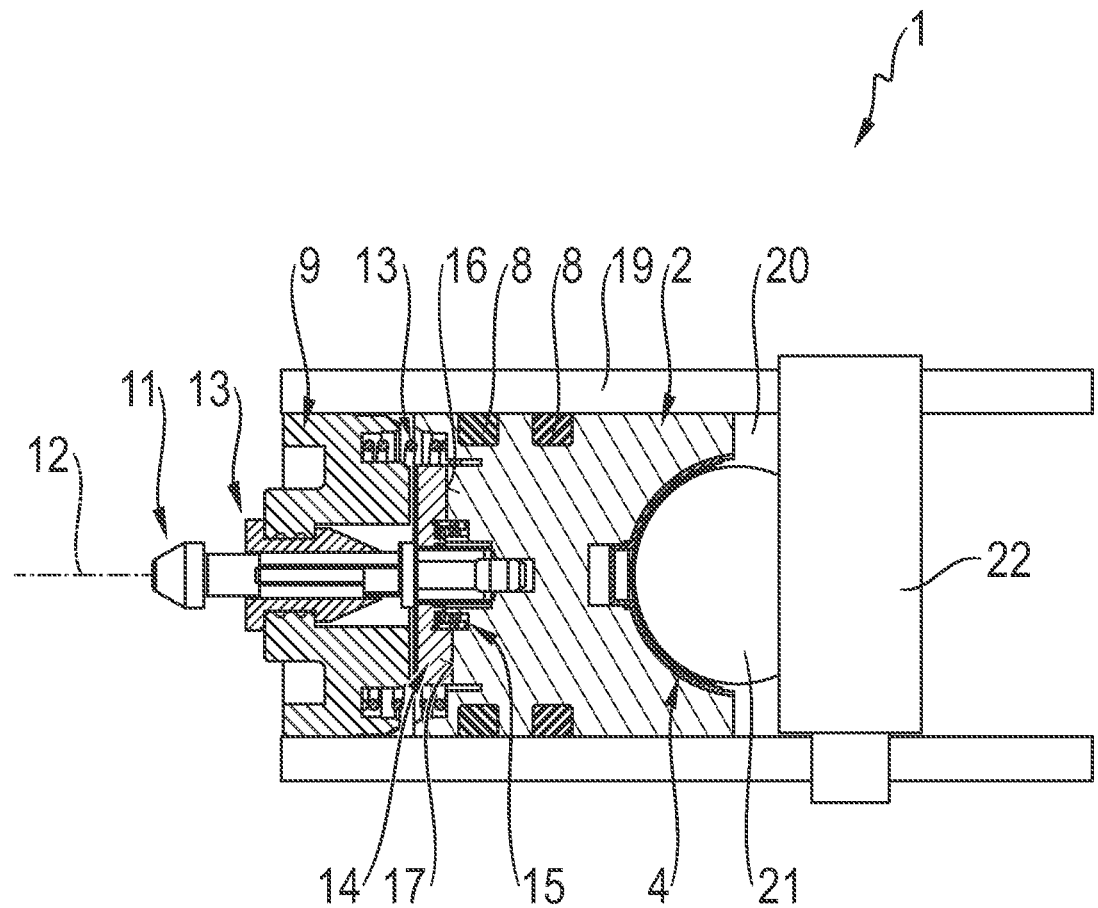
FIG. 3 shows a sectional side view of the first apparatus according to the disclosure as per FIG. 1.

FIG. 3 shows a sectional side view of the first apparatus according to the disclosure as per FIG. 1. In this respect, the apparatus 1 is arranged in a housing 19. In this embodiment, the housing 19 is a constituent part of a steering gear or a steering mechanism. The housing 19 may be a constituent part of the apparatus 1. The housing 19 has a housing interior space 20. In this embodiment, the housing interior space 20 has a hollow-cylindrical form. The bearing element 9 is fixed on the housing 19 and inside the housing interior space 20 in an axial direction with respect to the centre longitudinal axis 12. In this respect, the centre longitudinal axis 12 can also be considered a centre longitudinal axis 12 of the housing interior space 20. In this embodiment, the bearing element 9 forms a type of covering, cover or closure for the housing interior space 20.

The pressure piece 2 is arranged or guided so as to be displaceable inside the housing 19 in an axial direction of the centre longitudinal axis 12 of the housing interior space 20 or of the pressure piece 2. The prestressing element 13 is prestressed in an axial direction of the centre longitudinal axis 12. In this respect, as a result of the prestressing element 13 being arranged between the bearing element 9 and the pressure piece 2, the pressure piece 2 is subjected to a prestressing force in an axial direction with respect to the centre longitudinal axis 12 and directed away from the bearing element 9. The pressure piece 2 and the sliding element 4 arranged between the pressure piece 2 and the toothed rack 21 are thus pressed against the toothed rack 21. As a result, at the same time the toothed rack 21 is pressed against the pinion 22. The toothed rack 21 and the pinion 22 are illustrated only schematically here. The toothed rack 21 and the pinion 22 may be constituent parts of the apparatus 1. In this embodiment, the pinion 22 is realized as a pinion shaft. The pinion 22 may be in engagement with a gearwheel or worm gear, not illustrated in more detail here, such a gearwheel or worm gear being able to be driven or being driven by a motor. Consequently, the toothed rack 21 can be moved in a longitudinal direction of the toothed rack 21 by the driven pinion 22.

In this embodiment, a side, facing away from the second bearing face 17, of the adjusting disc 14 bears against the bearing element 9. The torsion spring 15 is arranged between the adjusting disc 14 and the pressure piece 2. The adjusting disc 14 is prestressed in a direction about the centre longitudinal axis 12 by the torsion spring 15. A rotation of the adjusting disc 14 owing to the torsion spring 15 and the interaction of the two bearing faces 16, 17 allows the pressure piece 2 to be adjusted or wear and/or tolerances to be compensated. As a result, an adjusting device is realized.

Figure 4A:
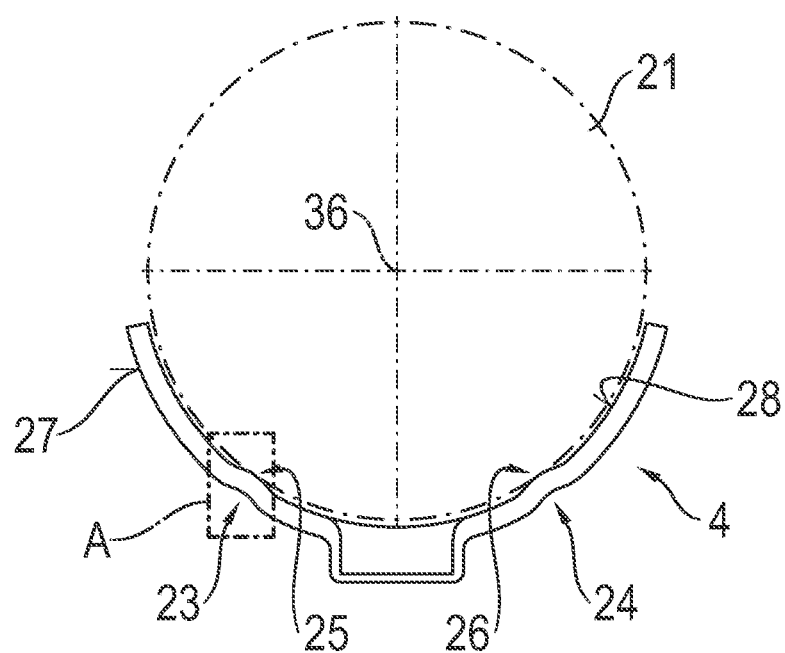
FIG. 4a shows a sectional side view of a sliding element in an unmounted state for the first apparatus according to the disclosure as per FIG. 1.

FIG. 4a shows a sectional side view of the sliding element 4 in an unmounted state for the first apparatus 1 according to the disclosure as per FIG. 1. The toothed rack 21 is indicated only schematically. The sliding element 4 has a substantially circular arc segment-like cross section. This cross section is designed to bear against the toothed rack 21 in a substantially form-fitting manner. To realize the spring function, the sliding element 4 has a spring contour. In this respect, the spring contour is designed in such a way that the sliding element 4 is under a prestress between the pressure piece 2, which is not illustrated in more detail here, and the toothed rack 21 in an axial direction of the centre longitudinal axis 12 in a mounted state.

Figure 4B:
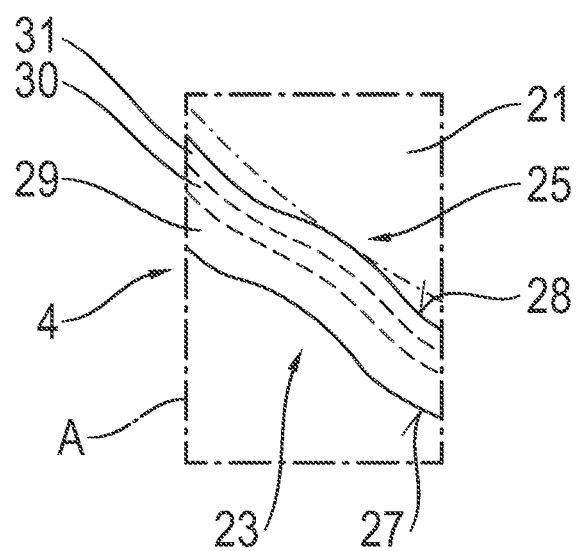
FIG. 4b shows a detail of the sectional side view of the sliding element in the unmounted state as per FIG. 4a, FIG. 5a shows a sectional side view of the sliding element in an unmounted state for the first apparatus according to the disclosure as per FIG. 1.

In this embodiment, the spring contour of the sliding element 4 is formed by two concave portions 23, 24 and two convex portions 25, 26, respectively. In this respect, the concave portion 23 and the convex portion 25 form a first common portion for forming the spring contour. Together with the convex portion 26, the concave portion 24 forms a further portion of the spring contour. The concave portions 23, 24 are formed on an inner side 27 of the sliding element 4. In the mounted state, the inner side 27 bears against the pressure piece 2. In this embodiment, the convex portions 25, 26 are formed on an outer side 28 of the sliding element 4. In the mounted state, the outer side 28 bears against the toothed rack 21. As shown in FIG. 4b, which is described below, the structure of the sliding element 4 and its spring contour will be described in more detail with reference to the detail A and on the basis of the concave portion 23 and the convex portion 25 by way of example.

FIG. 4b shows a detail A of the sectional side view of the sliding element 4 in the unmounted state as per FIG. 4a. In this embodiment, the concave portion 23 is in the form of a groove-like depression, which in the mounted state extends in an axial direction, or parallel to the longitudinal direction, of the toothed rack 21. In this embodiment, the convex portion 25 is in the form of a web-like elevation, which likewise extends in an axial direction, or parallel to the longitudinal direction, of the toothed rack 21. The concave portion 23 and the convex portion 25 may be formed as a result of forming the sliding element 4, for example.

In this embodiment, the concave portion 23 and the convex portion 25, on the one hand, and the concave portion 24 and the convex portion 26, on the other hand, are arranged in a predefined angle range with respect to the centre longitudinal axis 12 and proceeding from a centre point 36 of the toothed rack 21. Here, the concave portion 23 and the convex portion 25 are arranged in an angle range of approximately +25° to +40° with respect to the centre longitudinal axis 12. Here, the concave portion 24 and the convex portion 26 are arranged in an angle range of approximately −25° to −40° with respect to the centre longitudinal axis 12.

Furthermore, it is schematically illustrated here that the sliding element 4 has a multi-layered, such as a 3-layered embodiment, form. In this respect, a first material layer 29 is made from a spring steel in this embodiment. In the mounted state, the first material layer 29 bears against the pressure piece 2. A second material layer 30, which at the same time forms an intermediate layer, is made from bronze in this embodiment. In this embodiment, a third material layer 31 is made from a low-friction plastic. In the mounted state, the third material layer 31 bears against the toothed rack 21. The second material layer 30 is thus arranged between the first material layer 29 and the third material layer 31. Providing the spring steel material layer 29 makes it possible to easily and cost-effectively realize a spring function or spring contour.

Figure 5A:
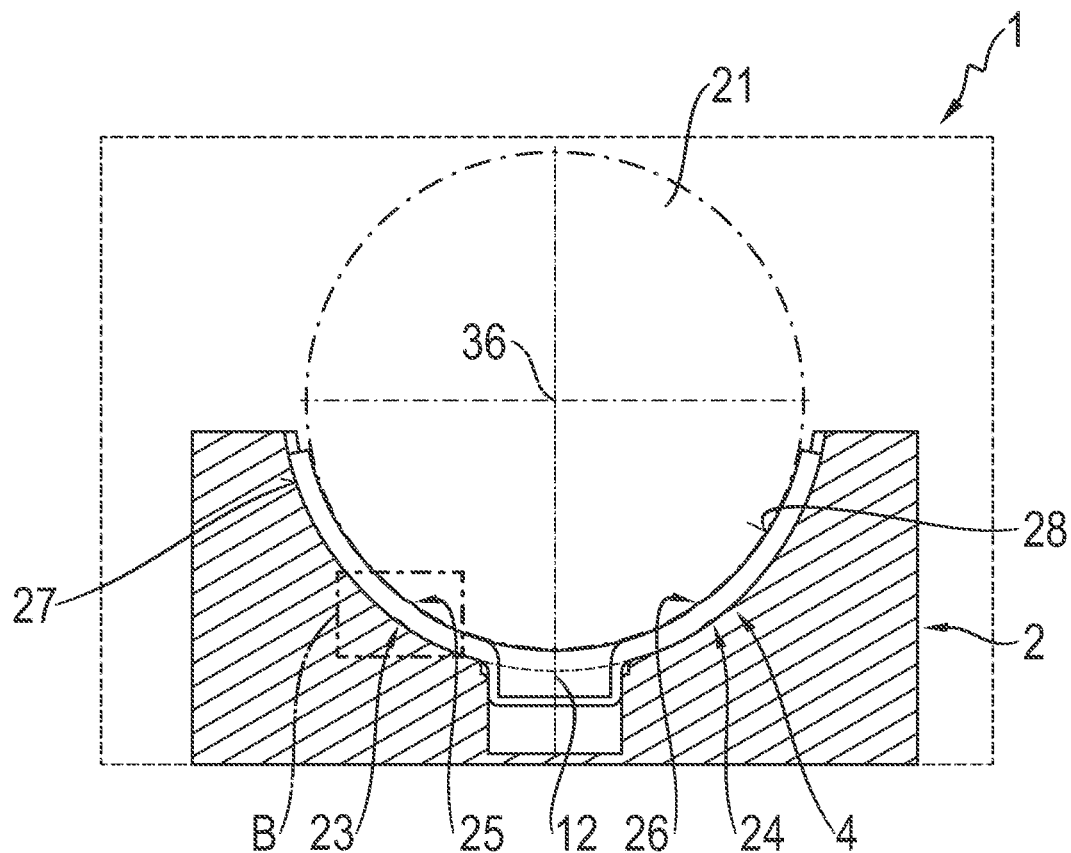
FIG. 5b shows a detail of the sectional side view of the sliding element in the unmounted state as per FIG. 5a, FIG. 6 shows a perspective side view of a pressure piece for the first apparatus according to the disclosure as per FIG. 1.

FIG. 5a shows a sectional side view of the sliding element 4 in a mounted state for the first apparatus 1 according to the disclosure as per FIG. 1. To provide better clarity, not all of the constituent parts of the apparatus 1 as per FIGS. 1 to 3 are shown. In the mounted state shown here, the toothed rack 21 is pressed against the pinion 22, which is not illustrated in more detail here, by the apparatus 1 or the pressure piece 2 as per FIG. 3. The detail B will be explained in more detail below with reference to FIG. 5b.

Figure 5B:
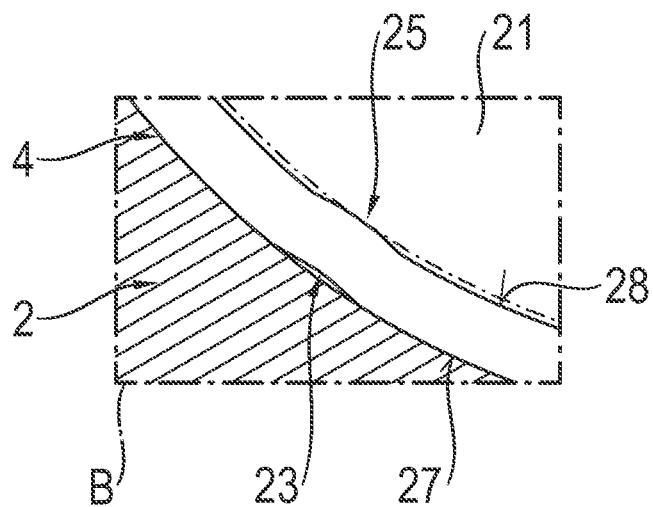

FIG. 5b shows a detail B of the sectional side view of the sliding element 4 in the mounted state as per FIG. 5a. In the mounted state, the portion of the spring contour formed by the concave portion 23 and the convex portion 25 is elastically deformed, as a result of which the sliding element 4 is under a prestress between the pressure piece 2 and the toothed rack 21 in an axial direction with respect to the centre longitudinal axis 12.

The statements made above in relation to the concave portion 23 and the convex portion 25 also correspondingly apply to the concave portion 24 and the convex portion 26.

Figure 6:
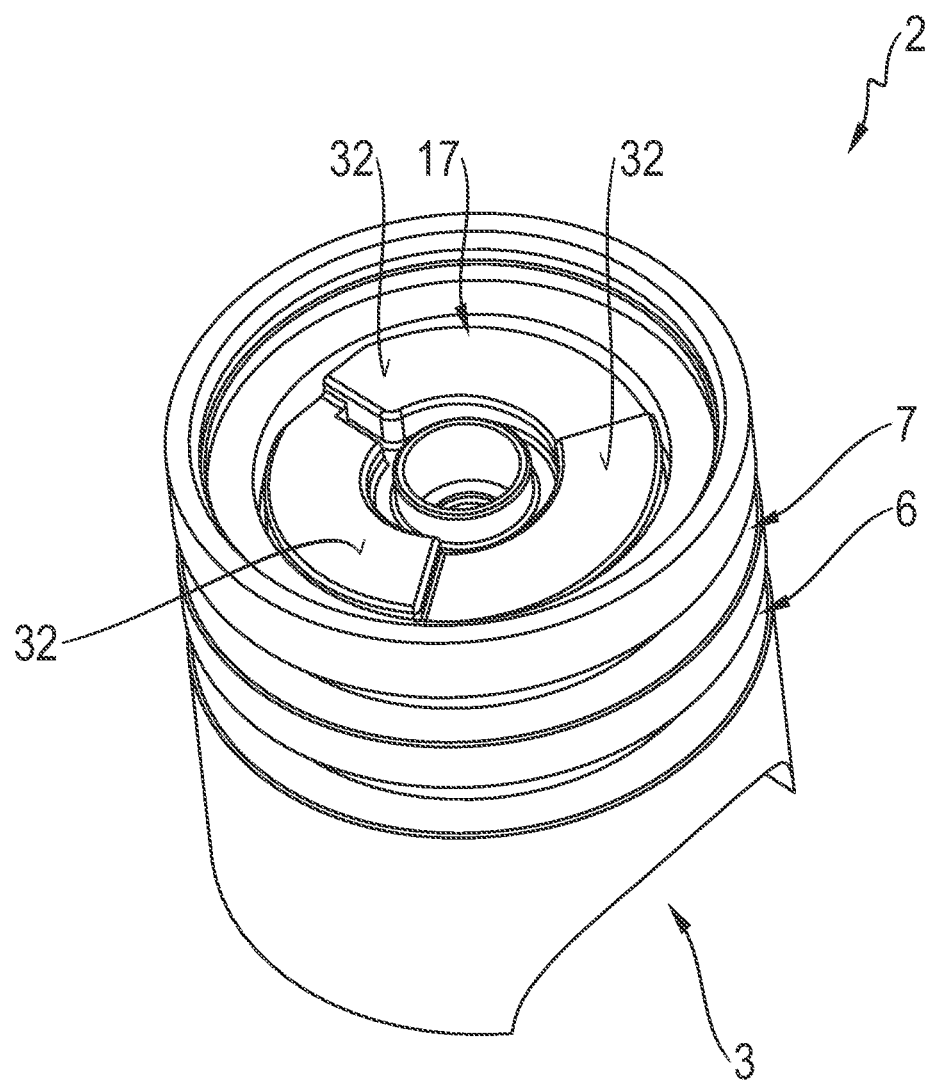

FIG. 6 shows a perspective side view of the pressure piece 2 for the first apparatus according to the disclosure as per FIG. 1. It can be seen that, in this embodiment, the pressure piece 2 has the second bearing face 17, which is formed in one piece with the pressure piece 2. The second bearing face 17 has multiple in-dined faces 32. In this embodiment, the second bearing face 17 overall has three in-dined faces 32. In another example, it is possible to realize only two inclined faces 32 or more than three inclined faces 32. The inclined faces 32 each have a circular arc segment-like form. In this respect, all of the inclined faces 32 have a respective identical slope in the same direction of rotation about the centre longitudinal axis 12.

Figure 7:
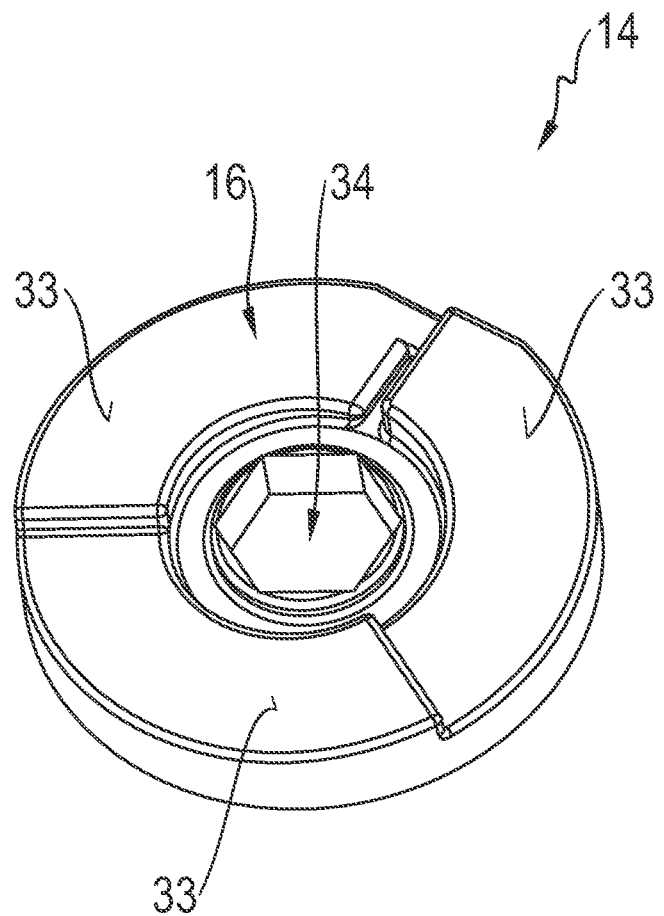
FIG. 7 shows a perspective side view of an adjusting disc for the first apparatus according to the disclosure as per FIG. 1.

FIG. 7 shows a perspective side view of the adjusting disc 14 for the first apparatus according to the disclosure as per FIG. 1. The first bearing face 16 of the adjusting disc 14 can be seen. Correspondingly to the second bearing face 17 as per FIG. 6, the first bearing face 16 likewise has multiple inclined faces 33. Since the inclined faces 33 of the adjusting disc 14 have a corresponding form to the inclined faces 32 of the second bearing face 17, in this embodiment the adjusting disc 14 overall has three inclined faces 33. The inclined faces 33 likewise have a circular arc segment-like form and have a respective identical slope in the same direction of rotation about the centre longitudinal axis 12, which is not illustrated in more detail here.

The adjusting disc 14 has a through-opening 34 for passing through the clamping pin 11, which is not illustrated in more detail here, in a form-fitting manner.

Figure 8A:
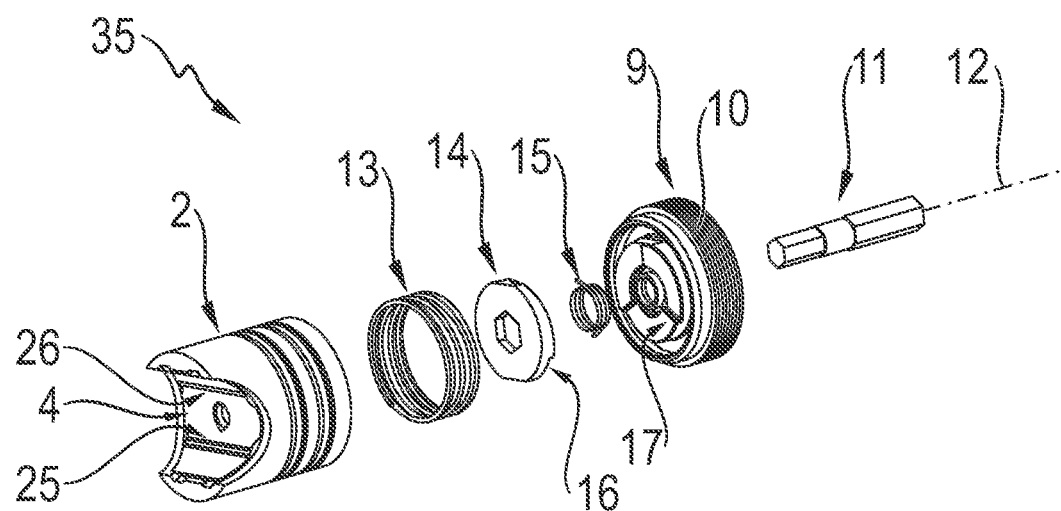
FIG. 8a shows an exploded illustration of the individual parts of a further apparatus according to the disclosure.

FIG. 8a shows an exploded illustration of the individual parts of a further apparatus 35 according to the disclosure. The same features bear the same reference signs as before. In this respect, reference is also made to the description above to avoid repetitions.

The structure and functioning of the apparatus 35 illustrated here substantially correspond to the apparatus 1. Thus, the apparatus 35 likewise has a sliding element 4, which provides a spring function in an axial direction of the centre longitudinal axis 12.

In contrast to the apparatus 1, in the case of the apparatus 35 the pressure piece 2 does not have the second bearing face 17, but rather the bearing element 9 has the second bearing face 17. In this respect, the second bearing face 17 is formed on a side, facing the pressure piece 2, of the bearing element 9. In a mounted state, which is not illustrated in more detail here, a side, facing away from the bearing element 9, of the adjusting disc 14 thus bears against the pressure piece 2. The first bearing face 16 of the adjusting disc 14 faces the second bearing face 17, the two bearing faces 16, 17 bearing against one another in a mounted state.

Figure 8B:
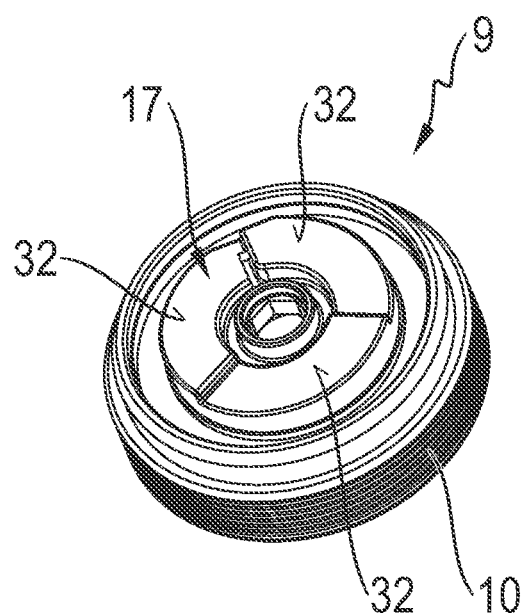

FIG. 8b shows a perspective side view of the bearing element 9 for the further apparatus 35 according to the disclosure as per FIG. 8a. It can be seen that, in this exemplary embodiment, the bearing element 9 has the second bearing face 17 with the inclined faces 32. The inclined faces 32 again respectively have a circular arc segment-like form, all of the inclined faces 32 having a respective identical slope in the same direction of rotation about the centre longitudinal axis 12.

The invention claimed is:

1. An apparatus for pressing a toothed rack against a pinion, having a pressure piece, wherein the pressure piece can be arranged so as to be displaceable inside a housing and in an axial direction of a centre longitudinal axis, having a bearing element that can be fixed on the housing in an axial direction with respect to the centre longitudinal axis, having a prestressing element that acts in an axial direction, wherein, by arrangement of the prestressing element between the bearing element and the pressure piece, the pressure piece is subjected to a prestressing force in an axial direction with respect to the centre longitudinal axis and directed away from the bearing element, wherein a sliding element is arranged on a side, facing away from the prestressing element, of the pressure piece for bearing against the toothed rack, wherein the sliding element is configured with a spring function in an axial direction of the centre longitudinal axis in order to compensate tolerances.

2. The apparatus according to claim 1, wherein the sliding element has a spring contour for the purpose of realizing the spring function, wherein, owing to the spring contour, the sliding element is under a prestress between the pressure piece and the toothed rack in an axial direction of the centre longitudinal axis in a mounted state.

3. The apparatus according to claim 2, wherein the spring contour has at least one concave portion and/or at least one convex portion on an inner side, facing the pressure piece, and/or on an outer side, facing the toothed rack, of the sliding element, wherein the spring contour has at least one convex portion or two convex portions on the outer side of the sliding element, wherein the spring contour has at least one concave portion or two concave portions on the inner side of the sliding element.

4. The apparatus according to claim 2, wherein the spring contour has multiple groove-like depressions, wherein the groove-like depressions extend in an axial direction of the toothed rack, wherein a respective groove-like depression is arranged in a first angle range of +20° to +45° and in a second angle range of −20° to −45° with respect to the centre longitudinal axis and proceeding from a centre point of the toothed rack.

5. The apparatus according to claim 4, wherein the spring contour has multiple web-like elevations, wherein the web-like elevations extend in an axial direction of the toothed rack, wherein a respective web-like elevation is arranged in a first angle range of +20° to +45° and in a second angle range of −20° to −45° with respect to the centre longitudinal axis and proceeding from a centre point of the toothed rack.

6. The apparatus according to claim 5, wherein the sliding element has a multi-layered, wherein multiple material layers of the sliding element are arranged one on top of another radially with respect to the longitudinal axis of the toothed rack, wherein the sliding element is made from spring steel or the sliding element comprises spring steel.

7. The apparatus according to claim 6, characterized in that a material layer facing the pressure piece is made from spring steel and a material layer facing the toothed rack is made from a plastic, wherein a material layer arranged between the spring steel material layer and the plastic material layer is made from bronze.

8. The apparatus according to claim 7, further comprising an adjusting device, which has an adjusting disc arranged between the bearing element and the pressure piece, wherein the adjusting disc is prestressed and/or rotatably mounted about the centre longitudinal axis by a torsion spring, the adjusting disc has a first bearing face with at least one inclined face, which bears against a second bearing face with at least one inclined face, wherein the second bearing face is in the form of a one-piece constituent part of the pressure piece or of the bearing element.

9. The apparatus according to claim 8, wherein the pressure piece has the second bearing face on a side facing away from the toothed rack, and a side, facing away from the second bearing face, of the adjusting disc bears against the bearing element.

10. The apparatus according to claim 8, wherein the bearing element has the second bearing face on a side facing the pressure piece, and a side, facing away from the bearing element, of the adjusting disc bears against the pressure piece.

11. An apparatus configured to press a toothed rack against a pinion, the apparatus comprising a pressure piece, a bearing element fixed on a housing in an axial direction with respect to a centre longitudinal axis, a prestressing element that is configured to act in an axial direction, wherein, by arrangement of the prestressing element between the bearing element and the pressure piece, the pressure piece is subjected to a prestressing force in an axial direction with respect to the centre longitudinal axis and directed away from the bearing element, wherein a sliding element is arranged on a side, facing away from the prestressing element, of the pressure piece such that the sliding element bears against the toothed rack, wherein the sliding element is configured with a spring function in an axial direction of the centre longitudinal axis.

12. The apparatus according to claim 11, wherein the sliding element comprises a spring contour, wherein, due to the spring contour, the sliding element is under a prestress between the pressure piece and the toothed rack in an axial direction of the centre longitudinal axis in a mounted state.

13. The apparatus according to claim 12, wherein the spring contour comprises at least one concave portion or at least one convex portion on an inner side, facing the pressure piece, or on an outer side, facing the toothed rack, of the sliding element, wherein the spring contour comprises at least one convex portion or two convex portions on the outer side of the sliding element, wherein the spring contour comprises at least one concave portion or two concave portions on the inner side of the sliding element.

14. The apparatus according to claim 12, wherein the spring contour comprises multiple groove-like depressions, wherein the groove-like depressions extend in an axial direction of the toothed rack, wherein a respective groove-like depression is arranged in a first angle range of +20° to +45° and in a second angle range of −20° to −45° with respect to the centre longitudinal axis and proceeding from a centre point of the toothed rack.

15. The apparatus according to claim 14, wherein the spring contour comprises multiple web-like elevations, wherein the web-like elevations extend in an axial direction of the toothed rack, wherein a respective web-like elevation is arranged in a first angle range of +20° to +45° and in a second angle range of −20° to −45° with respect to the centre longitudinal axis and proceeding from a centre point of the toothed rack.

16. The apparatus according to claim 15, wherein the sliding element comprises a multi-layered, wherein multiple material layers of the sliding element are arranged one on top of another radially with respect to the longitudinal axis of the toothed rack, wherein the sliding element is made from spring steel or the sliding element comprises spring steel.

17. The apparatus according to claim 16, wherein a material layer facing the pressure piece comprises spring steel and a material layer facing the toothed rack comprises a plastic, wherein a material layer arranged between the spring steel material layer and the plastic material layer is made from bronze.

18. The apparatus according to claim 17, further comprising an adjusting device comprising an adjusting disc arranged between the bearing element and the pressure piece, wherein the adjusting disc is at least one of pre-stressed or rotatably mounted about the centre longitudinal axis by a torsion spring, the adjusting disc comprises a first bearing face with at least one inclined face that bears against a second bearing face with at least one inclined face, wherein the second bearing face comprises a one-piece constituent part of the pressure piece or of the bearing element.

19. The apparatus according to claim 18, wherein the pressure piece comprises the second bearing face on a side facing away from the toothed rack, and a side, facing away from the second bearing face, of the adjusting disc bears against the bearing element.

20. The apparatus according to claim 18, wherein the bearing element comprises the second bearing face on a side facing the pressure piece, and a side, facing away from the bearing element, of the adjusting disc bears against the pressure piece.

* * * * *